Feb. 9, 1954  G. W. STODDARD  2,668,543
CORN HUSKING MACHINE HAVING COMBINATION
PICKING AND HUSKING ROLLS
Filed July 16, 1949  2 Sheets-Sheet 1
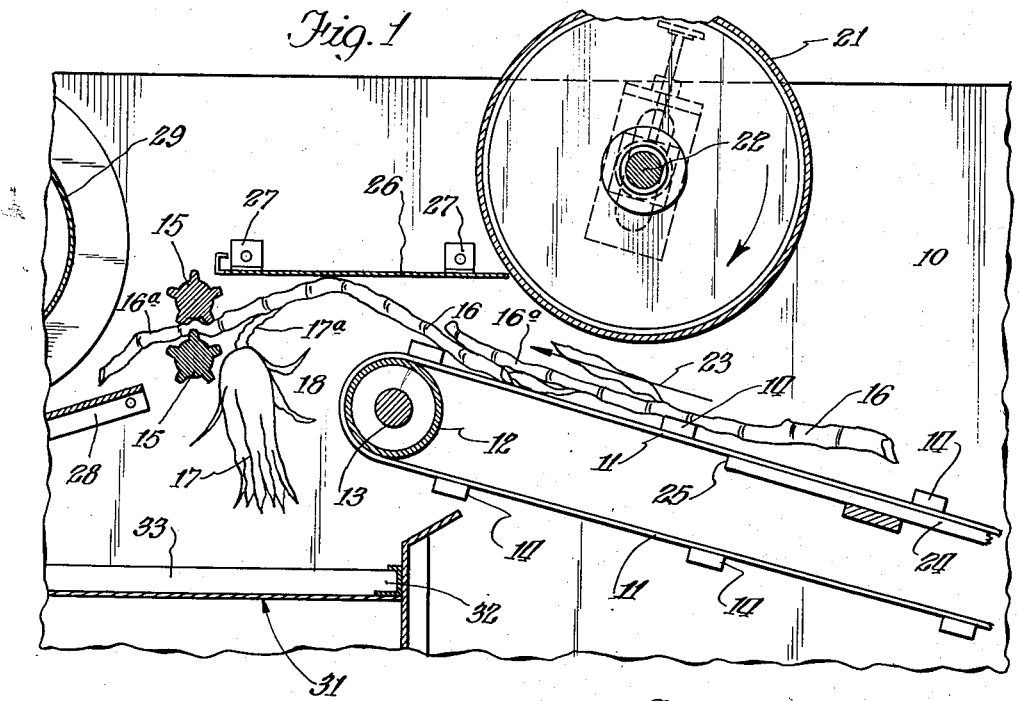
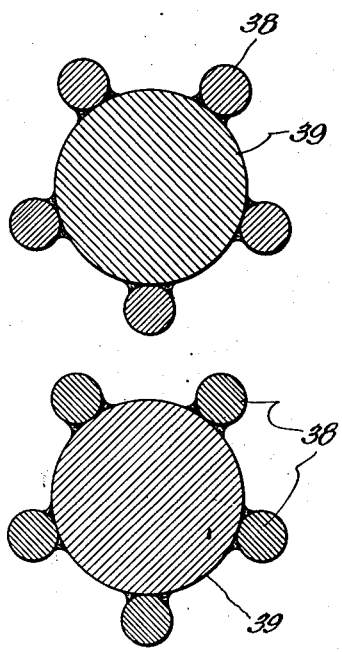
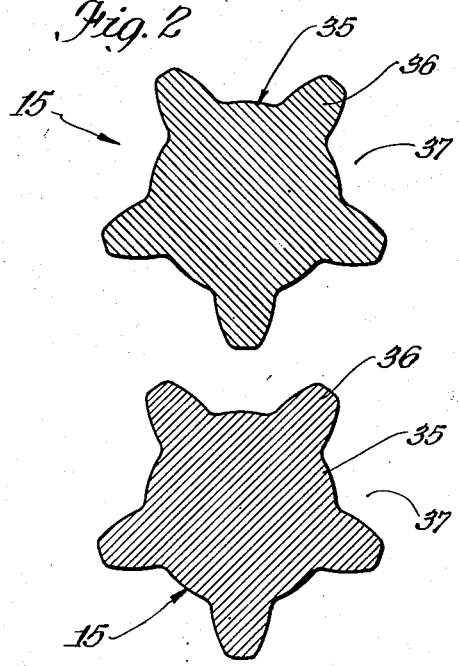
Inventor:
Glenn W. Stoddard
By: Clarence J. Loftus
Attorney.

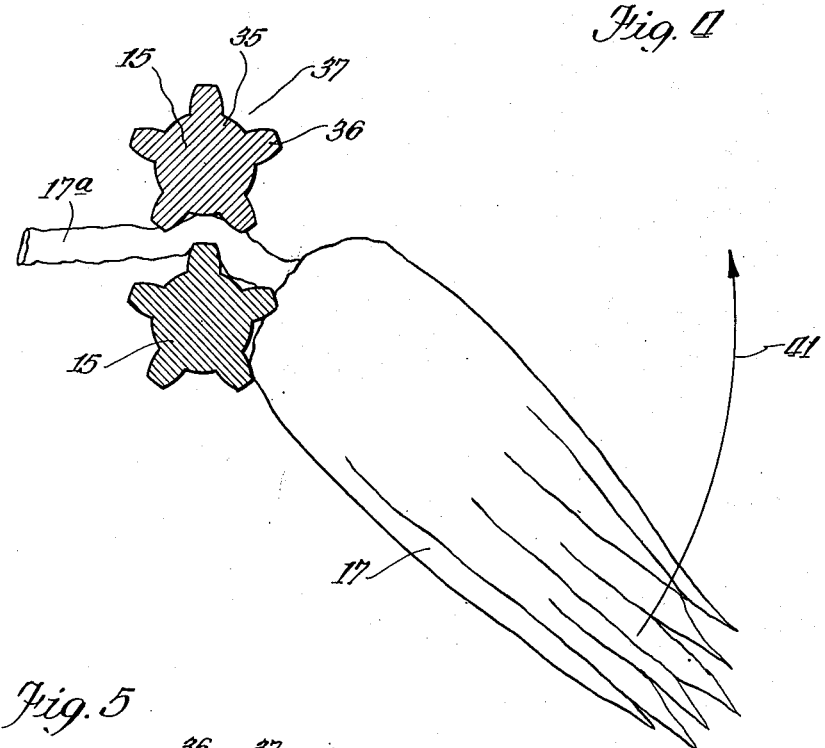
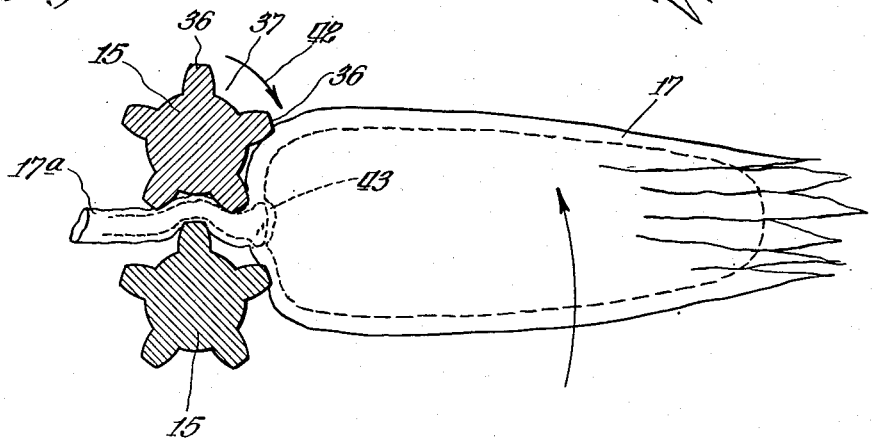

Patented Feb. 9, 1954

2,668,543

UNITED STATES PATENT OFFICE 2,668,543

CORN HUSKING MACHINE HAVING COMBINATION PICKING AND HUSKING ROLLS

Glen W. Stoddard, Grant Township, Tama County, Iowa

Application July 16, 1949, Serial No. 105,109

1 Claim. (Cl. 130—5)

This invention relates to corn picking and husking machinery, and the present application is a continuation-in-part of my co-pending application Ser. No. 706,917 for a Corn Picking Machine, filed October 31, 1946, now Patent No. 2,515,808. The novelty claimed in the present case resides in combination picking and husking rolls of unique formation, together with the means for feeding the corn and stalks through the rolls in the proper manner to accomplish rapid and efficient husking by a method quite different from those heretofore practiced.

The problem of mechanical corn harvesting and husking is one to which inventors have devoted much time over a long period of years with very little success. Some partially successful machines have been developed, but the usefulness of these has been largely negatived by the development of high yielding types of hybrid corn, the harvesting of which presents new and more difficult problems than those heretofore encountered. This is partially because of the fact that the stalks and ears of the hybrid crop are much larger and more luxuriant than previous types. The result is that prior types of rolls suited to husking small ears are apt to be overloaded and clogged by heavy stalks and abundant foliage, while rolls capable of feeding the large stalks without clogging display a seemingly incurable tendency to shell corn excessively, and often crush or feed through small ears. Yet it is still extremely important, as a matter of economics, to harvest substantially all of the crop, including the small ears and "nubbins" as well as the large ears. Thus, it has been a seemingly insoluble problem to provide feeding and picking means that will feed large masses of heavy stalks through without undue tendency to overload or clog, yet will pick ears of all sizes without excessive shelling. It is to this general aim that the present invention is directed.

The aim is accomplished by a new and improved husking mechanism which combines novel husking rolls and conveyor means capable of rapid, dependable, non-clogging feeding of a crop of high yield corn having large and luxuriant growth of stalks and leaves, yet so designed as to pick both large and small ears without adjustment, even under the various conditions encountered due to differing conditions of moisture, humidity, and maturity of the crop. This is accomplished by what is believed to be a radical departure from prior teachings and by the use of a combination of structures operating on a different principle than those heretofore contemplated. In the past, efforts have been made to feed the stalks through pressure rolls, and to snap the ears from the stalks by a squeezing action; ordinarily exerted by a pair of rolls of considerably larger diameter than the ears, so that the ears are cradled in the trough between the rolls.

According to the present teaching, the use of pressure rolls (and their tendency to clog when overloaded) is avoided by employing paired rolls with widely spaced ribs so designed that there is substantial clearance between the rolls at all times. This permits large stalks to pass without clogging or jamming, yet the rolls are so shaped as to exert a forward feeding action even on the slender stems of the ears or shreds of husks, and to eject the ears from the husks by an impact blow, rather than a squeezing action. This function is facilitated and the clogging tendencies of prior feeding devices overcome by departing further from the conventional practice of placing the husking rolls side by side, and contemplates the provision of a pair of husking rolls positioned one above the other. With this arrangement the stalks of corn may be fed to the machine and through the rolls in a horizontal direction, with the ears encountering the rolls in such a way that the ears are simultaneously severed from the stem and snapped out of the husk by the impact of a rotating rib of one of the rollers, yet the rolls contact the husk only and do not touch the kernels of the denuded ears. This is in sharp contrast with prior conventional machines, in which the ears lie longitudinally in the trough between the rolls so that the rolls engage the kernels directly after the husk is removed. Thus, the primary cause for unwanted shelling of corn is avoided and the yield correspondingly increased.

The present teaching also departs from the principles practiced in prior machines by the novel combination of a pair of rolls as indicated above, together with feeding mechanisms spaced well away from the rolls so that the stalks of corn being conveyed to the rolls (preferably tassel end first) are projected across a relatively wide, open gap as they enter the bite of the rolls. This gap is preferably about as wide as the length of a normal ear of corn, so that while the inherent rigidity of the relatively long stalks will cause them to bridge the gap and enter the rolls, the ears, which hang on relatively flexible stems, will tend to drop through the gap and will enter the rolls only when drawn into the bite thereof by the feeding action of the rolls on the stalks and stems. This is advantageous in several respects. In the first place, it means that the ears will be drawn into the bite of one of the rolls in such a manner as to utilize the momentum of the moving mass of the ear as well as the impact of a rapidly rotating rib on one of the rolls to accomplish a quick, positive picking and husking action. Moreover, this is done by impact alone, without squeezing on the kernels of corn adjacent the base of the ear and therefore with little or no tendency to shell the corn. In addition, it means that while it is contemplated that the stalks be fed through the rolls tassel end first, yet the machine can successfully handle stalks oppositely oriented without danger of clogging the machine and without in any way changing the position at which the ears themselves are drawn into the rolls at the instant of husking.

A further advantage inherent in the provision of the gap between the conveying means and the rolls is that it makes the machine almost impossible to clog, even by stalks disposed crosswise of the conveyor or by other foreign matter that might be picked up on the conveyor and fed into the machine.

The manner in which the foregoing aims and objects are accomplished may be best described in connection with the drawings of the present specification, wherein:

Figure 1 is a fragmental sectional view through the husking devices as employed in a corn harvesting machine of the type shown in my copending application S. N. 706,917, now Patent No. 2,515,808;

Figure 2 is a detail cross-sectional view of a pair of picking and husking rolls as contemplated by the present teaching;

Figure 3 is a detail cross-sectional view similar to Figure 2, showing a modified form of the picking and husking rolls;

Figure 4 is a reduced scale sectional view of the picking and husking rolls of Figure 2, illustrating the manner in which an ear of corn is fed to them; and Figure 5 is a reduced scale view similar to Figure 4 and illustrating the action of the rolls in severing an ear of corn from its stem and expelling it from the husk.

The harvester includes a frame of the general form shown in my prior application, having a pair of vertical aprons or side walls 10 on the opposite sides of an endless conveyor belt 11. The belt is quite wide, preferably being of width great enough to allow the machine to accommodate two rows of corn spaced approximately four feet apart with ample clearance on each side of both rows. The belt extends upwardly from a roller adjacent the cutter bar to an upper roller 12 mounted on a drive shaft 13 extending through the aprons 10 and provided with driving mechanism as illustrated in my earlier application. The conveyor belt may be of heavy canvas or other flexible material, and is preferably provided with a number of transverse members such as the cross strips 14 to facilitate the feeding of the stalks.

The upper end of the conveyor extends around the roller 12, which is spaced away from the combination picking and husking rolls 15 a distance substantially equal to the length of a normal ear of corn (which may be about 8 inches, more or less), so that as the stalks 16 are carried upwardly on a conveyor, their forward end portions 16a wil be projected into the bite of the rolls 15, while the ears 17 (which are held to the stalk only by their comparatively flexible stems 17a) will tend to drop through the open gap 18 between the roller 12 and the husking rolls 15. Thus as the corn is fed through the machine the stalks and ears may assume a position somewhat as shown in Figure 1.

Feeding of the stalks is facilitated by the provision of a feeding drum 21, mounted on a rotary shaft 22 spaced above the upper span of the conveyor 11 adjacent the upper roll 12, but spaced from the conveyor to provide a feed passage indicated by the arrow 23. This passage is preferably about three inches wide, since this has been found to be wide enough to accommodate the stalks and ears without undue pressure or crushing action. The feed drum rotates in a clockwise direction so that masses of stalks moving up the conveyor and coming to bear against the drum will be directed downwardly to pass unobstructedly through the feed passage under the drum, and the supporting slats 24 on which the upper span of the conveyor 11 moves are terminated at a point 25 spaced well away from the roll 12, so that the flexible conveyor is unsupported in the zone adjacent the feeder drum. With this arrangement, any excessive thickness of stalks passing through the feed channel will flex the conveyor belt downwardly to prevent clogging or jamming.

The conveyor 11 and the combination picking and husking rolls 15 are so positioned with respect to each other that the feed path, as indicated by the arrow 23, is directed slightly above the rolls. Thus as the stalks move upwardly on the conveyor their leading ends pass beyond the upper roller 12 and are projected across the gap 18. As this action takes place, the weight of the unsupported leading end portions of the stalks will normally cause them to sag downwardly to enter the rolls properly. The action is assisted by a guide plate 26 which is secured between the frame aprons 10 by brackets 27 and positioned to extend from a point immediately adjacent the under surface of the feeder drum to a point adjacent the top of the upper husking roll. Thus, if any stalks display a tendency to project upwardly, they will strike the under surface of this guide plate and be directed downwardly into the bite of the rolls as indicated in the illustration of Figure 1.

A trash chute 28 is inclined downwardly from the picking and husking rolls to carry the stalks and husks from the machine and, if desired, the movement of the stalks and husks down the chute may be accelerated by the provision of a rotary drum or shredder 29.

The husked ears fall into a discharge chute 31, which extends transversely of the machine below the gap 18 between the conveyor roll 12 and the picking and husking rolls 15, from which they are delivered to a wagon elevator (not shown). Movement of the corn along this chute is assured by the provision of a conveyor comprising a pair of laterally extending conveyor chains 32 with conveyor flights 33 extending between them to slide along the upper surface of the chute.

The husking rolls, which comprise one of the novel features of the present invention, differ from prior types of "pressure" rolls by a radical change in size, as well as important changes in configuration and relative spacing. For one thing, prior types of rolls are ordinarily of diameter considerably greater than the diameter of an ear of corn, so that they exert a squeezing action as the ears lie in the trough between the rolls. The present structure departs from this mode of operation by providing rolls so small that they cannot exert any appreciable squeezing action on an ear of normal size. Instead, they are so shaped and driven at such a speed that they act to pick and husk the ears by high velocity impact, which avoids the inherent tendency of all pressure or squeezing rolls to shell corn.

The details of structure of the combination picking and husking rolls 15 are illustrated in Figure 2, with a slightly modified structure for these rolls illustrated in Figure 3. In each case the overall diameter of the rolls is substantially the same diameter as a normal ear of corn; that is, about 2¼ inches overall. In the embodiment of Figure 2, the rolls each comprise a solid, extruding metal shape having a round body portion 35 formed with a plurality of straight longitudinal ribs 36. These ribs are wide at the bottom and narrow at the top, and are spaced apart from each other by grooves 37 having a top width greatly exceeding the top width of the ribs, and a bottom width at least equal to the bottom width of the ribs. The two rolls of the pair are geared together, with the ribs alternately offset from each other as illustrated, but it is to be noted that the ribs do not mesh with each other and thus do not act in the manner of conventional types of pressure rolls heretofore employed. On the contrary, the rolls are spaced apart from each other a distance slightly greater than their overall diameter so that although they exert a feeding action on stalks or husks between them, there is very substantial clearance between the metal surfaces of the two adjoining rolls at all times. The result is that although the rolls will exert a feeding action on even thin stems or shreds of husks, etc., yet they will pass thick, heavy stalks without displaying a tendency to overload, jam or crush the stalks excessively. The modified form of the invention illustrated in Figure 3 is substantially the same in action as the preferred form of Figure 2, but is made by welding or otherwise securing a plurality of rods 38 to a central shaft 39.

The method of operation by which the rolls husk the corn is illustrated in Figures 4 and 5. In viewing these figures it will be remembered that as the stalks project beyond the upper end of the feed conveyor and enter the bite of the rolls, the ears in passing over the gap 18 tend to drop downwardly so that they are drawn into the bite of the rolls by their relatively flexible stem portions 17a. Thus, as the ears are drawn into the rolls they reach a position somewhat as shown in Figure 4, in which the lowermost roll has engaged the butt of the ear in such a manner that further rotation of the rolls will swing the ear upwardly in a path of movement indicated at 41, tending to bring the ear toward horizontal position. As it approaches horizontal position, however, one of the ribs of the oppositely rotating upper roll moving in the direction indicated at 42 will strike the outside of the husk of the ear as illustrated in Figure 5. Now, since these rolls are normally rotated at a speed of about 1,000 R. P. M., the rib engaging the roll will strike it with a sharp, high velocity impact which, when delivered in opposition to the upward momentum of the ear, will act to sever the ear from the stem within the husk and at the point indicated at 43 in Figure 5. This causes a simultaneous picking and husking of the ear, since the severed ear will fall from its husk to the conveyor chute 31 and the husk will be drawn through the rolls 15 and discharged to the chute 28.

From the foregoing it will be seen that the present invention departs from prior teachings in several important respects that, in combination, bring about important improvements in function. The peculiar and unique structure of the rolls provides substantial clearance between their coacting surfaces at all times, so that heavy masses of husks, stalks and foliage may pass through the machine at high speed without tending to jam it or interfere with its operation. At the same time, these rolls are so positioned that their alternately offset ribs move in paths of movement approaching quite close to each other, so that they exert a fairly positive feeding action even on relatively light stems or shreds of husks, etc. The rolls themselves are quite small in their physical dimensions, having an outside diameter substantially equal to the diameter of a normal ear of corn, so that they display no tendency to grasp or squeeze an ear fed toward them. As a result they do not act in a manner as to crush the ears or tend to shell the kernels from them, but instead merely deliver an impact blow to each ear through the husk. This severs the stems within the husks so that the cobs and kernels are expelled and the husks drawn through the rolls and discharged from the machine.

The spaced relationship of the conveyor and rolls is of particular advantage in avoiding clogging, since with the arrangement shown it is almost impossible for a stalk and/or ear to come to rest in such a manner as to form a barrier preventing the movement of other stalks until a mass of foliage capable of clogging the machine accumulates. With the arrangement shown, any leaves or stalks tending to pile up on the conveyor are effectively leveled off by feeder drum 21, from whence they are directed toward the underside of the guide 26, and thence into the rolls. In the normal operation of the machine the stalks will enter tassel end first as shown, but even in the event that some of the stalks become reversed, the functioning of the machine will not be substantially altered, due to the fact that the presence of the open gap 18 between the conveyor and the rolls 15 allows the ears to drop down enough so that they are drawn into the bite of the rolls by their stems and thus always enter the picking and husking rolls butt first. The ears entering the rolls in this manner are thus subjected to identically the same husking action irrespective of which end of the stalk was the first to enter the rolls. In either case the ear is husked by what is believed to be a novel method, differing from prior types of squeezing devices by the provision of means for swinging the ears upwardly and then striking them an impact blow to sever the ear from the stem to expel it from the husk while feeding both stem and husk through the rolls and out of the machine.

The exact form of rolls and the precise arrangement of conveyor drum and rolls have been found to be ideally suited to accomplishment of the objects of this invention, but it is to be understood that the method here disclosed may be practiced by other instrumentalities, and the structures shown may be modified and altered to a certain extent without departing from the inventive concept here disclosed. It is accordingly pointed out that the scope of the inventive thought is not limited to the precise structure shown, but extends with equal force to any variations or modifications thereof coming within the terms of the appended claim.

Having thus described my invention, what I claim as new and desire to secure by United States Letters Patent is:

In a corn husking machine, in combination, a conveyor comprising a pair of rolls and an endless belt extending therebetween; a pair of relatively long picking and husking rolls each having a diameter of substantially two and one-quarter inches and provided with a plurality of protruding longitudinal ribs extending uninterruptedly along the entire length of said rolls, with each of the ribs in each roll being widely spaced from the other ribs thereon and with the ribs of one roll alternately positioned and in substantially spaced feeding relationship with the ribs of the other; said rolls being rotatably mounted in horizontal position parallel with one conveyor roll and with one of the husking rolls positioned over the other and an open, unobstructed gap between said husking rolls and the conveyor extending under the picking and husking rolls and providing a relatively large open space around said rolls as the ears of corn on said stalks drop through the gap and are supported only by their stems as the stalks are drawn into the bite of said rolls, thereby causing the ears to swing in an upward, arcuate path of movement around the lowermost husking roll as a rib of the upper roll engages the butt of the ear in a direction substantially normal to the surface thereof, and delivers a high velocity impact blow against the outside of the husk at the base of the ear to sever the ear from the stem within the husk.

GLEN W. STODDARD.

References Cited in the file of this patent

UNITED STATES PATENTS

| Number | Name | Date |
|---|---|---|
| 61,823 | Farnum et al. | Feb. 5, 1867 |
| 125,318 | McLeish | Apr. 2, 1872 |
| 498,320 | Steward | May 30, 1893 |
| 719,962 | Thompson | Feb. 3, 1903 |
| 1,019,838 | Rickel | Mar. 12, 1912 |
| 1,023,320 | Kaull | Apr. 16, 1912 |
| 1,142,181 | Kranich | June 8, 1915 |
| 1,188,084 | Kreitzer | June 20, 1916 |
| 1,196,258 | Mast | Aug. 29, 1916 |
| 1,635,569 | Ayars | July 12, 1927 |
| 1,942,011 | Urschel | Jan. 2, 1934 |
| 2,467,790 | Welty | Apr. 19, 1949 |